Feb. 23, 1954 F. H. WEBB 2,670,328
WATER SOFTENING APPARATUS
Filed Sept. 24, 1949 3 Sheets-Sheet 1

INVENTOR.
FRANCIS H. WEBB
BY
Frederick Diehl
ATTORNEY

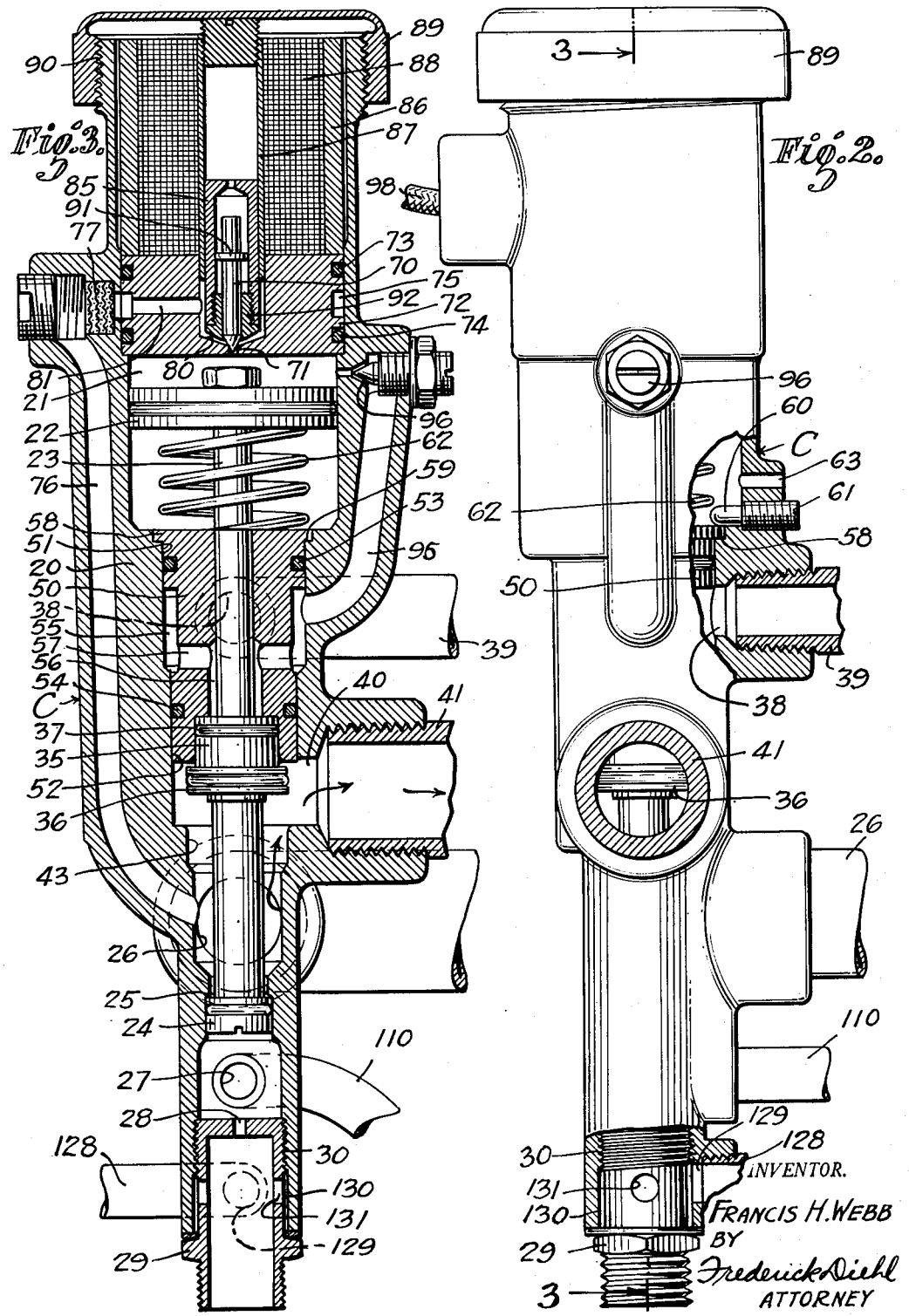

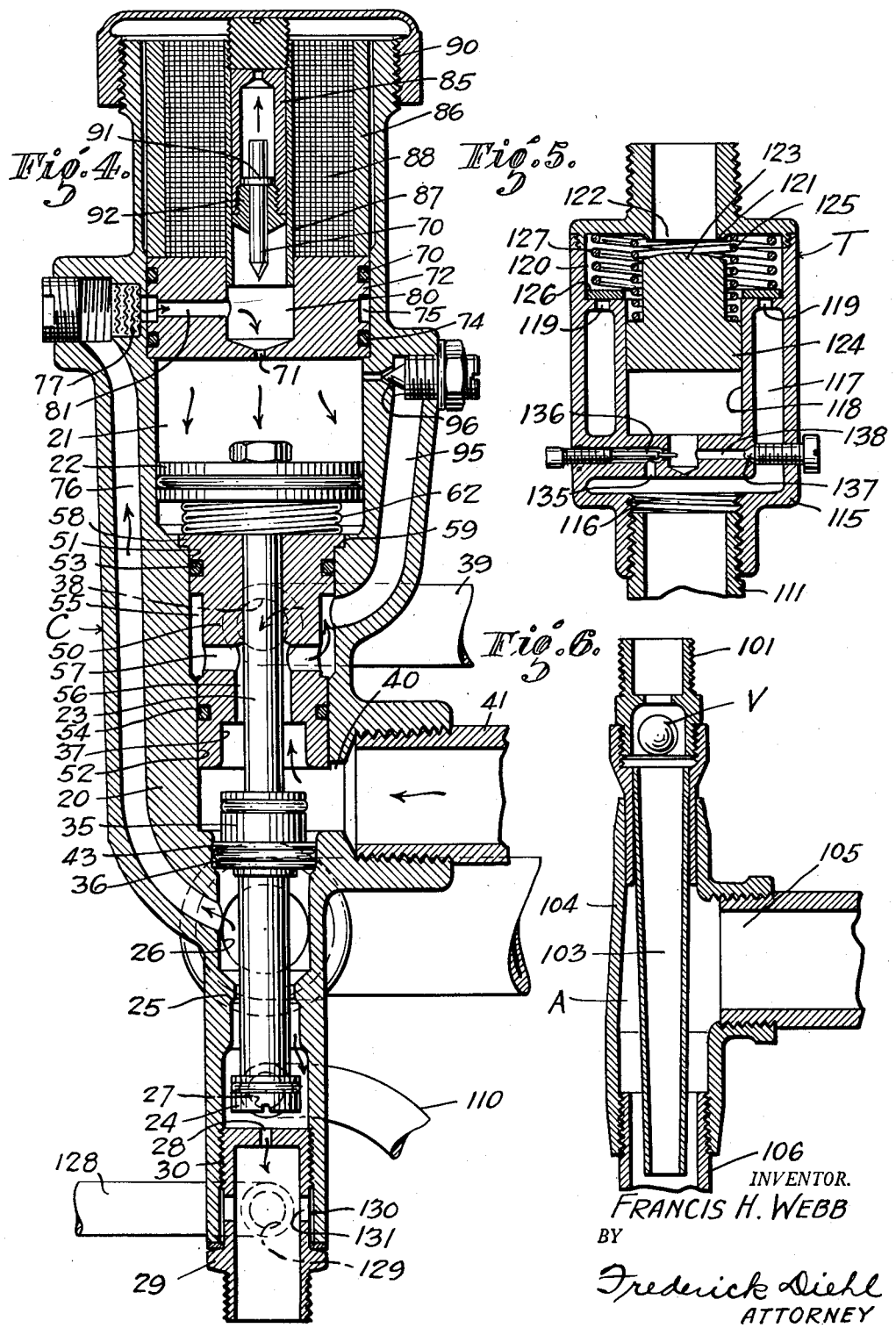

Patented Feb. 23, 1954

2,670,328

UNITED STATES PATENT OFFICE 2,670,328

WATER SOFTENING APPARATUS

Francis H. Webb, Pasadena, Calif.

Application September 24, 1949, Serial No. 117,524

2 Claims. (Cl. 210—24)

My invention relates generally to methods of and means for treating liquids, and more particularly to water softening apparatus.

The primary object of my invention is to provide a water softening apparatus which is structurally characterized in a manner to have among many advantages the following:

1. It is fully automatic in its regeneration of the exchanger bed, which is effected at such time intervals as are predetermined to insure a continuous supply of soft water.

2. Its brine tank is pressurized and sealed fluid-tight in a manner to entirely remove the danger of overflowing and of flooding the premises as is a serious disadvantage of every water softener heretofore proposed which is claimed to be automatic.

3. It entirely eliminates floats and float valves in the brine tank to control the liquid level therein, which are subject to deterioration by the action of salt water, and reduce the salt capacity of the brine tank.

4. It can be quickly adjusted to regenerate at any desired time interval in accordance with the amount of water used, and has sufficient salt storage capacity to care for the water needs of the average family having a 10 grain water supply, for an entire year, so as to reduce servicing of the apparatus to a minimum.

5. Eliminates an injector to raise the brine from the brine tank and deliver the brine to the exchanger bed, so as to enable the apparatus to effect regeneration with the relatively low pressure of 15 lbs. as compared to the minimum of 30 lbs. pressure required by automatic water softeners heretofore proposed.

It is a further object of my invention to provide a water softening apparatus of comparatively simple, compact and rugged construction, which can be assembled and disassembled with the utmost ease and dispatch and with but a few tools, and which embodies long life plastic lined softener and brine tanks to insure protection thereof against corrosion.

With these and other objects in view, my invention resides in the combinations, arrangements and functional relationships of elements as set forth in the following specification and particularly pointed out in the appended claims.

In the accompanying drawings:

Figure 2 is a view in side elevation and partly in section, of the main control valve embodied in my invention;

Figure 3 is a vertical longitudinal sectional view of the main control valve in service position, taken on the line 3—3 of Figure 2;

Figure 4 is a view similar to Figure 3 and showing the main control valve in regenerating position;

Figure 5 is a vertical axial sectional view of a hydraulic timing valve embodied in my invention; and Figure 6 is an enlarged vertical sectional view of a check valve and venturi, taken on the line 6—6 of Figure 1.

Figure 1:
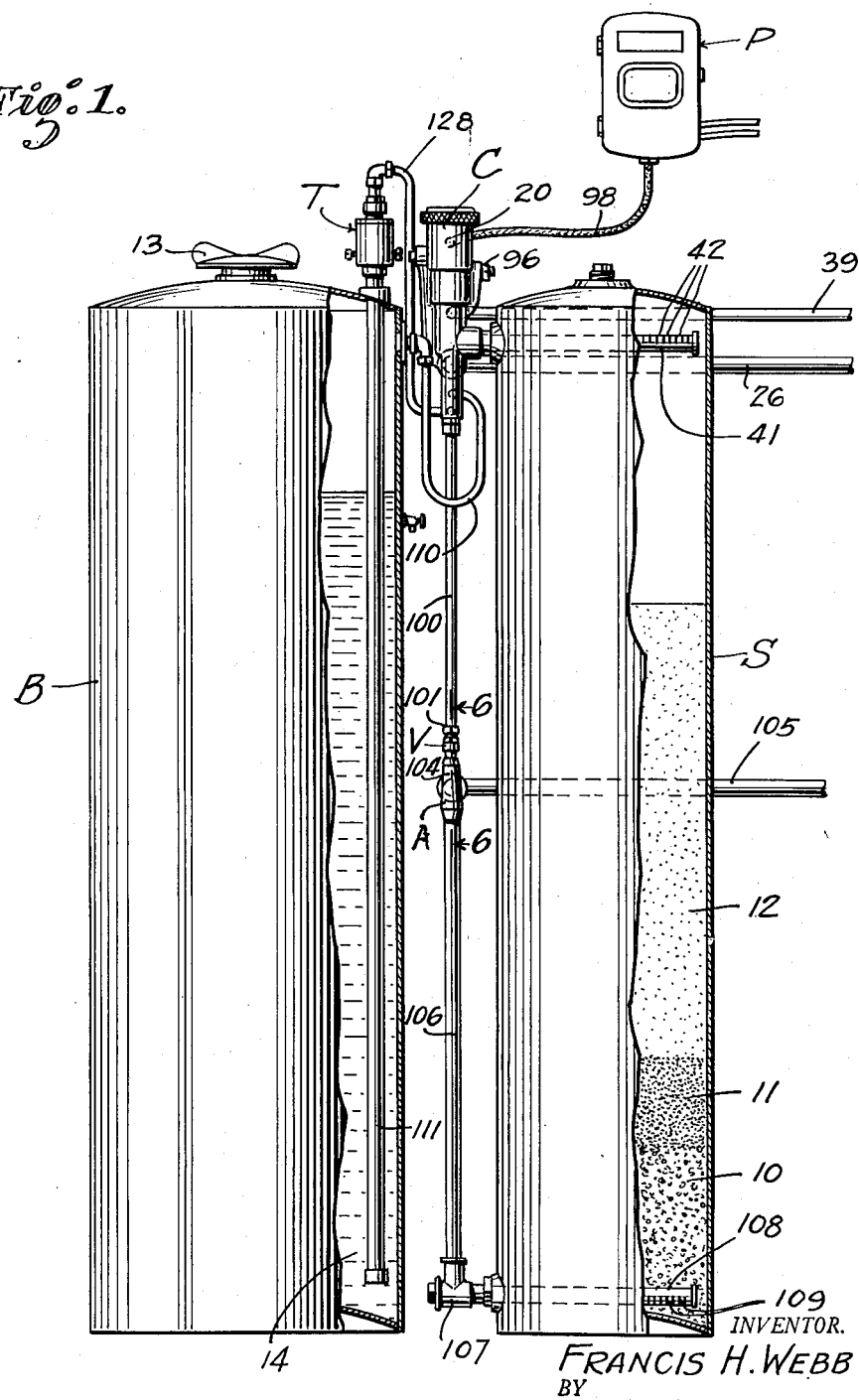
Figure 1 is a view in side elevation with parts in section, of one form of water softening apparatus embodying my invention.

Referring specifically to the drawings, my invention in its illustrated embodiment broadly comprises a softener tank S, a brine tank B, a main control valve C, a hydraulic timing valve T, a circuit controlling time mechanism which may be in the form of a conventional program timing clock P, and a check valve V with which is associated a venturi A.

The softener tank S which is of plastic lined sheet metal to resist corrosion, is provided with a bottom layer of gravel 10 on which is placed a layer of filtering sand 11, above which latter is an exchanger bed 12 preferably of "zeolite." The brine tank B which is disposed alongside the softener tank S is also of plastic lined sheet metal to resist corrosion, and is provided with a top filling opening adapted to be sealed fluid-tight by a removable cap 13. Conventional softener salt 14 is supplied to the brine tank for mixing with sufficient water to form a saturated solution.

The main control valve C comprises an elongated valve body 20 constructed of navel bronze and containing a hydraulic cylinder 21 in which works a reciprocable piston 22 fixed to one end of a stem 23. To the other end of the stem 23 is fixed a valve 24, which, in the service position of the valve C shown in Figure 3, has fluid-sealing engagement with an annular seat 25 in the body 20 to seal off a hard water inlet 26 from an outlet 27 and from a restricted orifice 28 in a nipple 29 screwed at 30 into the lower end of the body 20.

Intermediate the ends of the stem 23 are fixed valves 35 and 36, the former of which has fluid-sealing engagement with an annular seat 37 in the service position of the valve C, so as to disconnect a drain port 38 of a drain pipe 39 from a port 40 communicating with the interior of the softener tank S near the top thereof by means of a pipe 41 which is transversely slotted at intervals to provide a large number of narrow ports 42.

In this service position of the valve C, the valve 36 is disengaged from an annular seat 43 in the body 20 so as to place the hard water inlet 26 in communication with the port 40 for the delivery of hard water to the top of the softener tank S by means of the pipe 41. The annular seat 37 is formed in a cylindrical seat member 50, the end portions of which snugly fit in cylindrical bores 51 and 52 in the body 20, and are provided with sealing rings 53 and 54. The central portion of the seat member 50 is reduced in diameter to provide an annular passage 55 opening to the drain port 38 and to the annular seat 37 by means of an annular passage 56 in the seat member surrounding the stem 23, and radial passages 57 in the member, all as clearly shown in Figures 3 and 4.

The seat member 50 is provided with an annular flange 58 which is held against an annular shoulder 59 in the body 20 by means of a removable pin 60 carried by a screw 61 threadedly mounted in the body as clearly shown in Figure 2. A coil spring 62 is interposed between the seat member 50 and the piston 22 to urge the unitary structure formed by the piston, stem 23 and valves 24, 35 and 36 to the service position shown in Figure 3. A breather port 63 is provided in the body 20 for the cylinder 21 to relieve the latter of pressure during its movement from one extreme position to the other.

Movement of the piston 21 to the regenerating position shown in Figure 4 is effected hydraulically under the control of an electrically operated needle valve 70 which normally gravitates to seal fluid-tight, an inlet port 71 formed in the head 72 of the cylinder 21 which is removably fitted in the body 20 and is provided with sealing rings 73 and 74 at opposite sides of an annular passage 75 communicating with the hard water inlet 26 through a duct 76 and a filter 77.

The inlet port 71 also opens into a central chamber 80 of the head 72, and this chamber is in communication with the annular passage 75 by means of a radial passage 81 in the head, to the end that upon opening of the needle valve 70, water from the inlet 26 will flow into the cylinder 21 so as to act upon the piston 22.

The needle valve 70 is mounted in the hollow core 85 of a solenoid 86, and the core is reciprocable in a tube 87 supporting the solenoid winding 88 which is removably secured in the upper end of the body 20 by means of a cap 89 screwed onto the body as shown at 90. The needle valve 70 is provided with a stop flange 91 which co-acts with a plug 92 threaded into one end of the core 85, to provide a lost motion operative connection between the needle valve and core in a direction axially thereof, so that upon energization of the solenoid 86 the core will first be drawn into the tube 87 until the plug 92 engages the flange 91, whereupon the needle valve 70 will be jerked free of the port 71 to insure opening thereof for the flow of water into the cylinder 21 to effect movement of the piston 22 to the regenerating position shown in Figure 4.

A relief passage 95 in the body 20 connects the cylinder 21 with the drain port 38 under the control of an adjustable bleed valve 96, so as to permit water introduced into the cylinder to discharge therefrom into the drain pipe 39 when the needle valve 70 has been restored to its closed position, all so as to enable the piston 22 to return to its service position shown in Figure 3.

Current is supplied to the solenoid 86 to energize same at predetermined intervals, and to maintain the solenoid energized for a predetermined time interval, by operation of the program timing clock P with which the solenoid winding 88 is placed in circuit by means of conductors 98. As this program timing clock forms no part per se, of my present invention and is well known in the art, detailed description and illustration of its mechanism are believed unnecessary and will be dispensed with.

Connected to the nipple 29 is one end of a brine pipe 100, the other end of which is connected to a body 101 containing the ball check valve V and being axially prolonged to form a Venturi tube 103 (Figure 6) projecting freely into a T-fitting 104 having a lateral outlet pipe 105 for soft water, intermediate the length of the Venturi tube. The discharge end of the Venturi tube is co-axially related to and freely received in one end of an outlet pipe 106, the other end of which is connected by a fitting 107 to a pipe 108 extending horizontally into the softener tank S close to the bottom thereof and being slotted transversely in the manner of the pipe 41 so as to provide a large number of narrow ports 109.

By means of a pipe 110, the outlet 27 is placed in communication with the top portion of the brine tank B, so as to admit hard water thereto from the hard water inlet 26 when the valve 24 is in its regenerating position shown in Figure 4, and thus place the brine in the tank under pressure, all to the end of forcing the brine upwardly in a vertical pipe 111 which is open at its lower end and is submerged in the brine to a point adjacent to the bottom of the tank as shown in Figure 1. The upper end of the pipe 111 projects through a sealed opening in the top wall of the brine tank B and is connected to one end of the cylindrical body 115 of the hydraulic valve T to provide a brine inlet 116 to an annular chamber 117 surrounding a timing cylinder 118 in the body 115.

The chamber 117 has a circular series of outlet ports 119 which open into a chamber 120 having an annular valve seat 121 surrounding a brine outlet 122 controlled by a valve 123 formed on a piston 124 working in the timing cylinder 118 and normally urged by a coil spring 125 to disengage the seat 121. The ports 119 are controlled by a pressure compensating check valve 126 in the form of a flat ring which is normally urged by a coil spring 127 to close the ports so as to maintain a constant pressure in the chamber 117 irrespective of variations in pressure in the hard water source of supply. By means of a pipe 128, the brine outlet 122 is connected to an inlet 129 in the body 20 which is placed in communication with the brine pipe 100 by an annular passage 130 surrounding the nipple 29 and ports 131 in the latter.

The cylinder 118 has a metering inlet port 135 controlled by an adjustable timing valve 136 so as to enable the rate of flow of liquid into the cylinder to be varied. A bleed valve 137 controlling a second port 138 in the cylinder 118, is provided to facilitate setting of the timing rate by the valve 136 when making tests during installation of the apparatus, the operation of which is as follows:

With the valve C in its service position shown in Figure 3, hard water from the usual domestic source of supply will be free to flow through the inlet 26 past the open valve 36 and through the pipe 41 into the top of the softener tank S, then downwardly through the exchanger bed 12, sand 11, and gravel 10, so as to be rendered soft by the chemical action of the bed 12, then through pipes 108 and 106 to the soft water outlet pipe 105, This soft water also closes the check valve V so as to seal off the brine tank B from water pressure in order that the brine tank will be depressurized for the adding of salt thereto at any convenient time.

Let it be assumed that the program timing clock P has been set for regeneration of the softener tank S once a week, say at 2:00 a.m. on Sunday, and that the regeneration period is forty-five minutes which has been based on the hardness of the water in the area drawn from, as well as on the amount of water used on the premises.

When the time for regeneration arrives, the clock P closes the circuit from a source of current supply to the solenoid 86, thus energizing same and actuating the core 85 which jerks open the needle valve 70. Water from the inlet 26 is now free to flow through duct 76, passage 81, chamber 80 and inlet port 71 into the cylinder 21 so as to act upon the piston 22 and move same against the spring 62 to the regenerating position shown in Figure 4.

As the valve 36 is now closed, the supply of hard water to the top of the softener tank S is discontinued, and water from the inlet 26 is free to flow past the open valve 24 through the outlet 27 and the pipe 110 into the top of the brine tank B. The brine tank is thus placed under pressure so as to force brine solution upwardly through the pipe 111, inlet 116 of the hydraulic timing valve T, annular chamber 117, then through ports 119 by forcing open the ring valve 126 against the action of the spring 127, then past the normally open valve 123 through outlet 122, pipe 128 into pipe 109 wherein the downward flow of brine is accelerated by water entering the restricted orifice 28 of the nipple 29.

The brine solution now passes the open check valve V, and the velocity of the solution is increased by the Venturi tube 103 so as to continue past the soft water outlet 105 without entering same even though a faucet or other fixture be opened to dispense water during the regenerating period.

The brine continues its downward flow through the pipe 106, fitting 107 and pipe 109 into the bottom of the softener tank so as to be forced successively through the gravel 10, sand 11 and exchanger bed 12. Water in the softener tank in advance of the incoming brine is forced thereby through the pipe 41 past the open valve 35, through annular passage 56, radial passages 57, annular passage 55, drain port 38 and drain pipe 39.

As the flow of brine progresses through the softener tank, there is also a relatively small flow through the metering port 135 of the hydraulic timing valve T into the timing cylinder 118 so as to act upon the piston 124 and close the valve 123, thus cutting off the flow of brine to the softening tank when the time interval predetermined by the adjustment of the metering valve has elapsed.

The brine injection portion of the regenerating operation is now completed, and the rinsing portion thereof is initiated to remove calcium chloride which has been displaced by the sodium chloride solution from the brine tank B. This rinsing is effected by the continued flow of water from the inlet 26 through the restricted orifice 28, and is calculated to flow through the softener tank from the pipes 100, 106 and 108 to the pipe 41 and drain pipe 39 at the rate of approximately one and three-quarter gallons per minute until the predetermined regenerating period has elapsed. At such time the clock P breaks the electrical circuit to the solenoid 86, thus deenergizing same and permitting the needle valve 70 to gravitate to its closed position with respect to the port 71.

The spring 62 is now free to act in restoring the piston 22 to its service position as the water in the cylinder is forced therefrom by the piston past the bleed valve 96, through the passage 95 and into the drain pipe 39.

With the control valve C in its service position, the valve 35 has been closed to stop the flow of water from the softener tank S through the pipe 41 into the drain pipe 39, whereas the valve 36 will have been opened to again deliver hard water from the inlet 26 to the softener tank through the pipe 41. As the valve 24 has also been closed, the timing cylinder 118 is relieved of water pressure so as to permit the spring 125 to restore the valve 123 to its open position shown in Figure 5. Concurrently, the flow of rinsing water to the bottom of the softener tank through the orifice 28 is discontinued, as is the flow of water to the top of the brine tank B through outlet 27 and pipe 110.

The ball check valve V again seals off the brine tank B so as to remove the pressure therefrom and thus permit the adding of salt to the tank at any time during service of the apparatus. The Venturi tube 103 effectively separates the regenerating operation from the soft water line by not permitting any water to enter the latter until the apparatus has been restored to service, thus protecting the water heater and any other fixtures from salting up should water be used during regeneration of the apparatus.

The spring loaded ring valve 126 compensates for variations in water pressure so as to insure a uniform pressure of water in the cylinder 118 to act upon the piston 124 and thus enable a preselected timing of the closing movement of the valve 123 by adjustment of the metering valve 136 to be accurately maintained.

I claim:

1. Automatic water softening apparatus comprising: a softener tank having a hard water inlet and a soft water outlet; a sealed brine tank; a valve body having a hydraulic cylinder; a piston working in said cylinder and having a stem; two valves fixed to said stem for movement by the piston to occupy a service position or a regenerating position; one of said valves, when in service position, connecting said hard water inlet to a source of hard water under pressure for the flow of water through the softener tank to a service line; the other of said two valves, when in regenerating position, connecting the brine tank to the soft water outlet to force brine in a counterflow direction through the softener tank; an inlet valve controlling the admission of water to said cylinder; means operatively connected to said inlet valve to open same for a predetermined period of time so as to effect movement of said two valves to regenerating position; means restoring said two valves to service position when said predetermined time interval has elapsed; a timing device through which brine is delivered from said other of said valves to the softener tank for only a predetermined portion of the regenerating period; and means including a third valve fixed to said stem, through which the counterflow of rinsing water from said one of said two valves through the softener tank is effected during the remaining portion of the regenerating period.

2. Automatic water softening apparatus comprising: a softener tank having a hard water inlet and a soft water outlet; a sealed brine tank; a valve body having a hydraulic cylinder; a piston working in said cylinder and having a stem; two valves fixed to said stem for movement by the piston to occupy a service position or a regenerating position; one of said valves, when in service position, connecting said hard water inlet to a source of hard water under pressure for the flow of water through the softener tank to a service line; the other of said two valves, when in regenerating position, connecting the brine tank to the soft water outlet to force brine in a counterflow direction through the softener tank; an inlet valve controlling the admission of water to said cylinder; electromagnetic means operatively connected to said inlet valve to open same when the electromagnetic means is energized; time mechanism controlling the supply of current to said electromagnetic means to open said inlet valve at a predetermined time and maintain the inlet valve open for regeneration of the softener tank during a predetermined time interval; a hydraulically controlled timing valve through which brine is delivered from said other of said two valves to the softener tank for only a predetermined portion of the regenerating period; means including a third valve fixed to said stem, through which the counterflow of rinsing water from said one of said two valves through the softener tank is effected during the remaining portion of the regenerating period; and means restoring said valves to service position when said time interval has elapsed.

FRANCIS H. WEBB.

References Cited in the file of this patent

UNITED STATES PATENTS

| Number | Name | Date |
|---|---|---|
| 1,276,629 | Duggan | Aug. 20, 1918 |
| 1,646,581 | Eisenhauer | Oct. 25, 1927 |
| 1,652,710 | Dotterweich | Dec. 13, 1927 |
| 1,751,061 | Ter Beest | Mar. 18, 1930 |
| 1,811,890 | Linsay | June 30, 1931 |
| 1,918,225 | Dotterweich | July 11, 1933 |
| 1,938,628 | Huppertz | Dec. 12, 1933 |
| 1,976,439 | Dotterweich | Oct. 9, 1934 |
| 2,247,964 | Reynolds | July 1, 1941 |
| 2,265,225 | Clark | Dec. 9, 1941 |
| 2,329,350 | Kaysen | Sept. 14, 1943 |
| 2,396,809 | Addison | Mar. 19, 1946 |
| 2,435,366 | Riche | Feb. 3, 1948 |
| 2,539,748 | Mueller | Jan. 30, 1951 |